(12) United States Patent
Takeyama

(10) Patent No.: US 11,380,912 B2
(45) Date of Patent: Jul. 5, 2022

(54) FUEL CELL SYSTEM AND FUEL CELL VEHICLE

(71) Applicant: TOYOTA JIDOSHA KABUSHIKI KAISHA, Toyota (JP)

(72) Inventor: Makoto Takeyama, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 268 days.

(21) Appl. No.: 16/659,704

(22) Filed: Oct. 22, 2019

(65) Prior Publication Data

US 2020/0144636 A1 May 7, 2020

(30) Foreign Application Priority Data

Nov. 7, 2018 (JP) .............................. JP2018-209310

(51) Int. Cl.

| | |
|---|---|
| *H01M 8/04029* | (2016.01) |
| *H01M 8/04111* | (2016.01) |
| *H01M 8/04701* | (2016.01) |
| H01M 8/04089 | (2016.01) |
| H01M 8/0432 | (2016.01) |

(52) U.S. Cl.
CPC .... *H01M 8/04029* (2013.01); *H01M 8/04111* (2013.01); *H01M 8/04701* (2013.01); *H01M 8/04104* (2013.01); *H01M 8/04373* (2013.01); *H01M 8/04738* (2013.01)

(58) Field of Classification Search
CPC ......... H01M 8/04029; H01M 8/04111; H01M 8/04104; H01M 8/04373; H01M 8/04701; H01M 8/04738; H02K 9/19; H02K 9/197; H02K 7/14; F04D 29/5806; F04D 25/0606; F04D 17/10
See application file for complete search history.

(56) References Cited

U.S. PATENT DOCUMENTS

| | | | | |
|---|---|---|---|---|
| 2007/0087241 | A1* | 4/2007 | Mulvenna | H01M 8/04067 429/410 |
| 2007/0160881 | A1* | 7/2007 | Ukai | H01M 8/0606 429/410 |
| 2009/0078506 | A1* | 3/2009 | Franconi | B64D 13/02 184/5.1 |

(Continued)

FOREIGN PATENT DOCUMENTS

| | | |
|---|---|---|
| JP | S5623594 A | 3/1981 |
| JP | H07332591 A | 12/1995 |

(Continued)

*Primary Examiner* — Ula C Ruddock
*Assistant Examiner* — Matthew W Van Oudenaren
(74) *Attorney, Agent, or Firm* — Dickinson Wright, PLLC

(57) ABSTRACT

A compressor included in a fuel cell system comprises a compression chamber configured to compress the air by a rotating body; and a drive chamber arranged to separate from the compression chamber, provided with a driving mechanism that is placed therein to drive the rotating body, configured such that oil flows through, and placed to communicate with a first end portion of a depressurization pipe. When being viewed in a direction opposed to one side face of a fuel cell, a cooling medium piping and the depressurization pipe including a rising portion that is extended vertically upward are arranged to intersect with each other on the one side face.

7 Claims, 8 Drawing Sheets

(56) References Cited

U.S. PATENT DOCUMENTS

| | | | | |
|---|---|---|---|---|
| 2010/0244595 A1* | 9/2010 | Sheth | ............ | E21B 43/128 |
| | | | | 310/54 |
| 2016/0281740 A1* | 9/2016 | Mitsuda | ............ | F04D 17/10 |
| 2016/0308228 A1* | 10/2016 | Takahashi | ......... | H01M 8/04395 |
| 2017/0096172 A1* | 4/2017 | Nagaosa | ............ | B62D 27/02 |
| 2017/0133691 A1 | 5/2017 | Yamafuji | | |

FOREIGN PATENT DOCUMENTS

| | | |
|---|---|---|
| JP | H11107986 A | 4/1999 |
| JP | 2008-144724 A | 6/2008 |
| JP | 2010254174 A | 11/2010 |
| JP | 2016-186238 A | 10/2016 |
| JP | 2017087849 A | 5/2017 |
| WO | WO2015186438 | * 12/2015 |

* cited by examiner ional views illustrating the
FUEL CELL SYSTEM AND FUEL CELL VEHICLE

CROSS REFERENCE TO RELATED APPLICATIONS

The present application claims priority from Japanese patent application 2018-209310 filed on Nov. 7, 2018, the entirety of the content of which is hereby incorporated by reference into this application.

BACKGROUND

Field

The present disclosure relates to a fuel cell system and a fuel cell vehicle.

Related Art

A compressor configured to compress a gas is widely used in a fuel cell system with a view to supplying the air as an oxidizing gas to a cathode. A known compressor includes a motor, a rotating shaft driven by the motor and an impeller mounted to the rotating shaft and is configured to circulate oil used for lubricating and cooling down respective parts, in a closed space provided with the motor and other driving portions (see Patent Literature 1, for example).

Patent Literature 1: JP 2008-144724A

The compressor during operation generates heat in the closed space provided with the motor and the other driving portions. A pressure increase in this closed space accompanied with such heat generation has a possibility of oil leakage from this closed space to a compression chamber provided with an impeller placed therein to compress the air. Such oil leakage may cause oil to be mixed in with the air that is to be supplied from the compressor to the fuel cell and may thus cause a trouble.

SUMMARY

According to one aspect of the present disclosure, there is provided a fuel cell system. This fuel cell system comprises a fuel cell; a compressor configured to compress the air and feed the compressed air to a cathode of the fuel cell; a cooling medium piping arranged such that a cooling medium flows through therein to cool down the fuel cell; and a depressurization pipe including a first end portion, a second end portion, and a rising portion that is extended vertically upward, the depressurization pipe being configured such that the first end portion is connected with the compressor and that the second end portion is open to the atmosphere. The compressor comprises a compression chamber configured to compress the air by a rotating body; and a drive chamber arranged to separate from the compression chamber, provided with a driving mechanism that is placed therein to drive the rotating body, configured such that oil flows through therein, and placed to communicate with the first end portion of the depressurization pipe. When being viewed in a direction opposed to one side face of the fuel cell, the depressurization pipe and the cooling medium piping are arranged to intersect with each other on the one side face.

DETAILED DESCRIPTION

A. First Embodiment (A-1) General Configuration of Fuel Cell Vehicle

Figure 1:
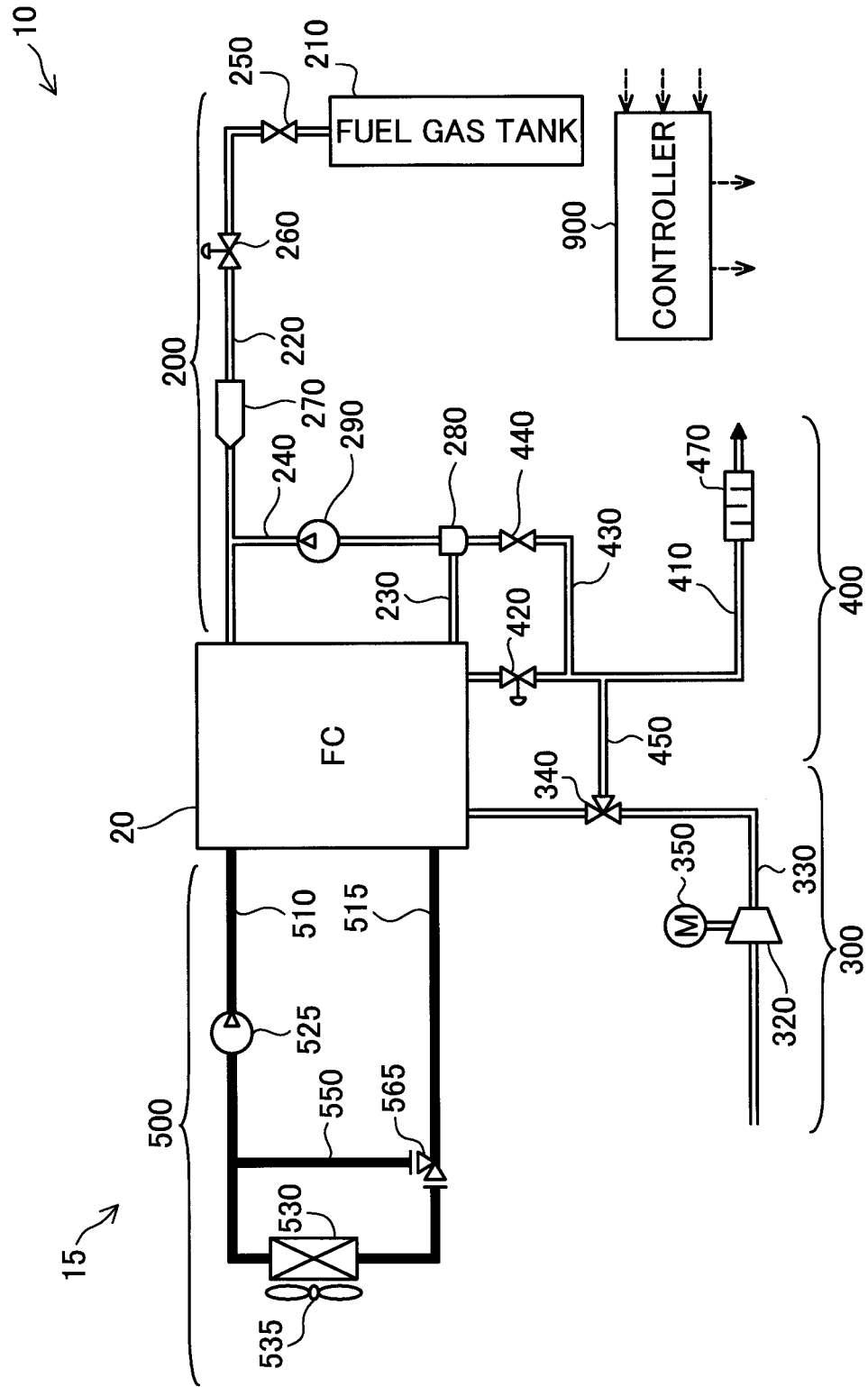
FIG. 1 is a diagram illustrating the schematic configuration of a fuel cell system.

FIG. 1 is a schematic diagram illustrating the schematic configuration of a fuel cell system 15 mounted on a fuel cell vehicle 10 according to a first embodiment of the present disclosure. The fuel cell system 15 includes a fuel cell 20, a fuel gas supply system 200, an oxidizing gas supply system 300, an exhaust gas system 400, a cooling system 500 and a controller 900.

The fuel cell 20 is a device configured to generate driving energy of the fuel cell vehicle 10. The fuel cell 20 has a stacked structure formed by stacking a plurality of unit cells and is configured to receive supplies of a fuel gas containing hydrogen and an oxidizing gas containing oxygen and to generate electricity. According to the embodiment, the fuel cell 20 is a polymer electrolyte fuel cell. Each of the unit cells constituting the fuel cell 20 has a flow path (anode-side flow path) formed on an anode side such as to cause the fuel gas to flow therein and a flow path (cathode-side flow path) formed on a cathode side such as to cause the oxidizing gas to flow therein, across an electrolyte membrane. A cooling medium flow path is also formed inside of the fuel cell 20 such as to cause a cooling medium for cooling down the fuel cell 20 to flow therein. The fuel cell 20 is, however, not necessarily limited to the polymer electrolyte fuel cell but may be another type of fuel cell, for example, a solid oxide fuel cell.

The fuel gas supply system 200 includes a fuel gas tank 210, a fuel gas supply pipe 220, a fuel gas emission pipe 230, a fuel gas recirculation pipe 240, a main stop valve 250, a regulator 260, an injector 270, a gas liquid separator 280 and a hydrogen pump 290. The fuel gas tank 210 is a storage device configured to store hydrogen gas as the fuel gas and is connected with the fuel cell 20 via the fuel gas supply pipe 220. In the fuel gas supply system 200, the hydrogen gas stored in the fuel gas tank 210 is subjected to pressure reduction by the regulator 260 and is then supplied from the injector 270 to the anode-side flow path of the fuel cell 20.

The fuel gas emission pipe 230 is a flow path which an anode off-gas discharged from the fuel cell 20 flows in. The fuel gas recirculation pipe 240 is connected with the fuel gas emission pipe 230 and with a location on a downstream side of the injector 270 in the fuel gas supply pipe 220. The anode off-gas discharged from the fuel cell 20 to the fuel gas emission pipe 230 goes through the fuel gas recirculation pipe 240 and is led again to the fuel gas supply pipe 220. Accordingly, in the fuel cell system 15, the fuel gas is circulated through a flow passage including the fuel gas emission pipe 230, the fuel gas recirculation pipe 240, part of the fuel gas supply pipe 220 and the flow path of the fuel gas formed inside of the fuel cell 20, while hydrogen contained in the fuel gas is consumed by power generation. The fuel gas recirculation pipe 240 is provided with the hydrogen pump 290 to pressurize the fuel gas for the purpose of circulation of the fuel gas.

The gas liquid separator 280 is provided at a connection between the fuel gas emission pipe 230 and the fuel gas recirculation pipe 240. The anode off-gas contains nitrogen and impurities such as water vapor, in addition to hydrogen that is not consumed by power generation. The gas liquid separator 280 serves to separate water from a gas component (including hydrogen, nitrogen and the like) in the anode off-gas. According to the embodiment, the impurities are removed from the fuel gas circulated in the flow passage described above by means of the gas liquid separator 280.

The oxidizing gas supply system 300 includes a compressor 320, an oxidizing gas supply pipe 330, and a flow dividing valve 340. The fuel cell 20 of the embodiment uses the air as the oxidizing gas. The compressor 320 is driven by a compressor motor 350 to compress the air and supply the compressed air through the oxidizing gas supply pipe 330 to the cathode-side flow path of the fuel cell 20. The configuration of the compressor 320 will be described later in detail. The flow dividing valve 340 is provided at a connection between the oxidizing gas supply pipe 330 and an oxidizing gas bypass pipe 450 that is connected with the oxidizing gas supply pipe 330 as described later.

The exhaust gas system 400 includes an exhaust gas pipe 410, a pressure regulating valve 420, a fuel gas discharge pipe 430, a purge valve 440, an oxidizing gas bypass pipe 450, and a silencer 470. The exhaust gas pipe 410 is a flow path arranged to discharge a cathode off-gas from the fuel cell 20. The exhaust gas pipe 410 is provided with the pressure regulating valve 420. The pressure regulating valve 420 serves to regulate the pressure of the oxidizing gas in the fuel cell 20. The fuel gas discharge pipe 430 is arranged to connect the gas liquid separator 280 with the exhaust gas pipe 410. The fuel gas discharge pipe 430 is provided with the purge valve 440. When the purge valve 440 is temporarily opened, water and the gas are discharged from the gas liquid separator 280. This reduces the concentration of the impurities contained in the fuel gas that is circulated in the flow passage as described above. According to the embodiment, the fuel gas discharge pipe 430 is connected with the exhaust gas pipe 410 at a position on a downstream side of the pressure regulating valve 420. Hydrogen included in the anode off-gas discharged via the purge valve 440 is diluted with the cathode off-gas before being released to the atmosphere.

The oxidizing gas bypass pipe 450 is arranged to connect the oxidizing gas supply pipe 330 with the exhaust gas pipe 410. The flow dividing valve 340 is provided at the connection between the oxidizing gas bypass pipe 450 and the oxidizing gas supply pipe 330 as described above. When the purge valve 440 is opened, the controller 900 increases a driving amount of the compressor 320 and controls the flow dividing valve 340 such as to cause the air to flow in the oxidizing gas bypass pipe 450. Such control enables hydrogen discharged via the purge valve 440 to the exhaust gas pipe 410 to be sufficiently diluted, irrespective of the amount of power generation by the fuel cell 20. The silencer 470 is provided on a downstream side of a connection between the fuel gas discharge pipe 430 and the oxidizing gas bypass pipe 450 in the exhaust gas pipe 410 to reduce the exhaust sound.

The cooling system 500 includes a cooling medium supply pipe 510, a cooling medium discharge pipe 515, a cooling medium bypass pipe 550, a cooling medium pump 525, a radiator 530 and a rotary valve 565. The cooling medium supply pipe 510 is a pipe arranged to supply the cooling medium to the fuel cell 20. The cooling medium pump 525 is placed in the cooling medium supply pipe 510. The cooling medium discharge pipe 515 is a pipe arranged to discharge the cooling medium from the fuel cell 20. The radiator 530 is provided between a downstream portion of the cooling medium discharge pipe 515 and an upstream portion of the cooling medium supply pipe 510 to cool down the cooling medium. The radiator 530 is provided with a radiator fan 535. The radiator fan 535 is configured to blow the air to the radiator 530 and accelerate heat release from the radiator 530. The cooling medium pump 525 described above is configured to regulate the flow rate of the cooling medium that is circulated through the cooling medium supply pipe 510, the cooling medium discharge pipe 515 and the cooling medium flow path provided in the fuel cell 20.

The cooling medium bypass pipe 550 is a flow path arranged to connect the cooling medium supply pipe 510 with the cooling medium discharge pipe 515. The rotary valve 565 is provided at a branch portion where the cooling medium bypass pipe 550 is branched off from the cooling medium discharge pipe 515, to change over the flow passage of the cooling medium between a flow path going through the radiator 530 and the cooling medium bypass pipe 550 bypassing the radiator 530. The rotary valve 565 is a valve provided to change a ratio of the flow rate of the cooling medium flowing through the radiator 530 and the flow rate of the cooling medium bypassing the radiator 530. The rotary valve 565 is a known valve configured to regulate the flow rate of a fluid by rotation of an internal member.

The controller 900 is configured by a microcomputer and includes a CPU, a ROM, a RAM and input/output ports. The controller 900 is configured to control power generation of the fuel cell system 15 and to control the entire fuel cell vehicle 10. The controller 900 obtains output signals from sensors provided in respective parts of the fuel cell vehicle 10 (including sensors provided in the respective portions of the fuel cell system 15, an accelerator position sensor, a brake pedal sensor, a shift position sensor and a vehicle speed sensor). The controller 900 outputs driving signals to the respective parts of the fuel cell vehicle 10 involved in power generation, driving and the like or more specifically to the respective valves, the respective pumps and the like included in the fuel cell system 15 described above. The controller 900 achieving these functions may not be necessarily configured as a single control unit. The controller 900 may be comprised of a plurality of control units, for example, a control unit involved in the operations of the fuel cell system 15, a control unit involved in driving of the fuel cell vehicle 10, and a control unit involved in controlling auxiliary machines that are not related to driving of the fuel cell vehicle 10. Required pieces of information may be transmitted between the plurality of such control units.

(A-2) Configuration of Compressor

Figure 2:
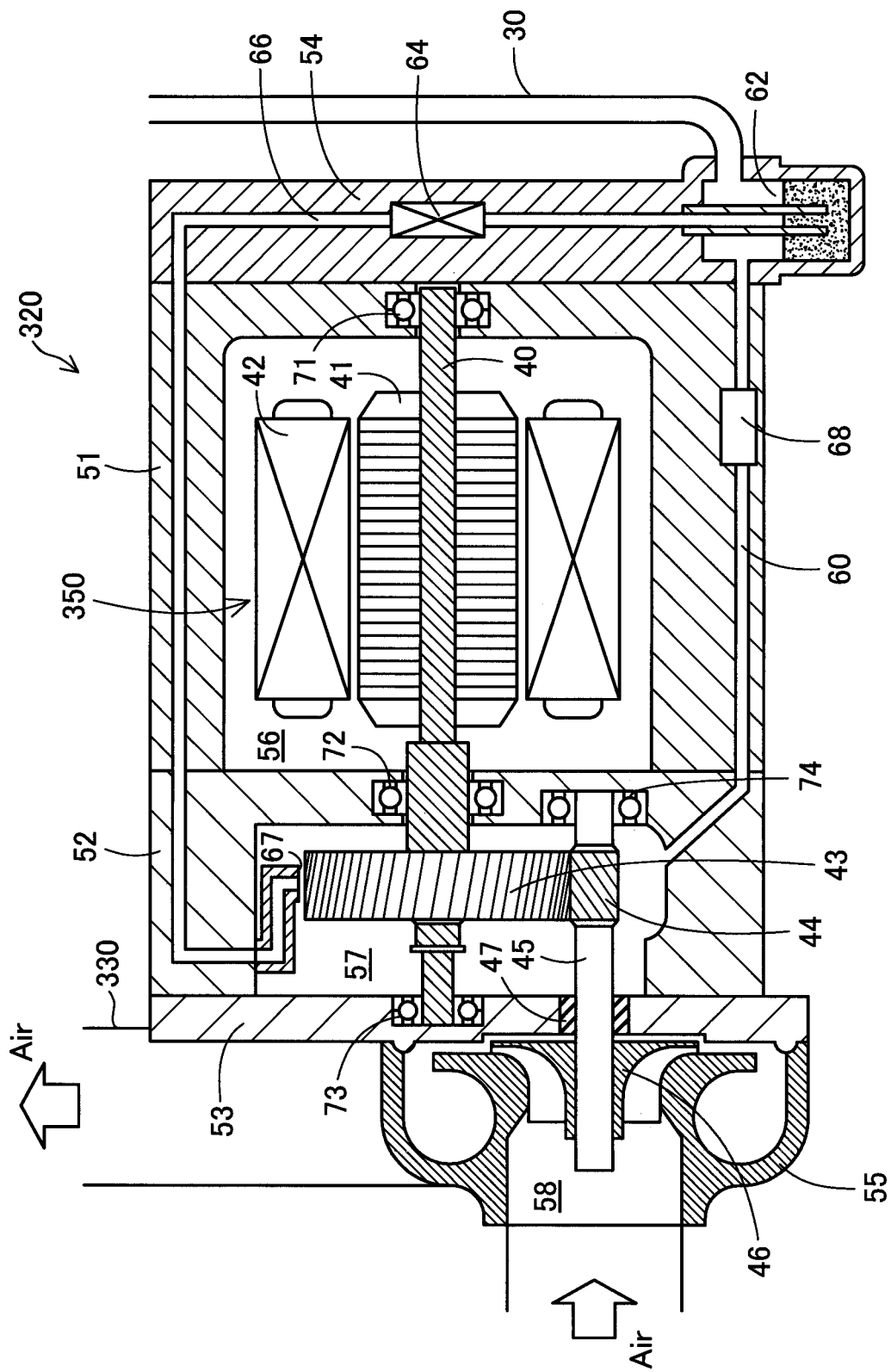
FIG. 2 is a schematic sectional view illustrating the configuration of a compressor.

FIG. 2 is a schematic sectional view illustrating the configuration of the compressor 320 according to the embodiment. FIG. 2 and subsequent drawings are used to illustrate the configuration of the compressor 320 or the technical features involved in arrangement of the compressor 320 in an easily understandable way and do not intend to accurately show the dimensions of the respective portions.

The compressor 320 includes a first housing member 51, a second housing member 52, a third housing member 53 and a fourth housing member 54. Each of the first housing member 51 and the second housing member 52 has a tubular shape that is open at one end and has a bottom portion formed at the other end. The first housing member 51 and the second housing member 52 are arranged such that the open end of the first housing member 51 comes into contact with the bottom portion of the second housing member 52. This configuration forms a motor chamber 56 inside of the first housing 51 to place the compressor motor 350 described above therein. A first oil flow path 60 described later is formed in the first housing member 51. The first oil flow path 60 is provided with an oil cooler 68. The third housing member 53 is a plate-like member. The third housing member 53 is arranged to come into contact with the open end of the second housing member 52, so that a speed-up chamber 57 is formed inside of the second housing member 52. The fourth housing member 54 is arranged to come into contact with the bottom portion of the first housing member 51. An oil reservoir 62 is formed in the fourth housing member 54 to be located on a lower side of the speed-up chamber 57 in a vertical direction. A second oil flow path 66 is also formed in the fourth housing member 54 to communicate with the oil reservoir 62 and is provided with an oil pump 64. A fifth housing member 55 is placed to come into contact with a different side of the third housing member 53 that is opposite to the second housing member 52. A compression chamber 58 is formed inside of the fifth housing member 55 to compress the air by an impeller 46 serving as a rotating body.

The compressor motor 350 placed in the motor chamber 56 is a motor provided to convert electric energy into mechanical energy and includes a first rotating shaft 40, a rotor 41 mounted to the first rotating shaft 40, and a stator 42 placed to be opposed to an outer circumferential face of the rotor 41. The rotor 41 has a magnet (not shown) and is configured to integrally rotate with the first rotating shaft 40. The stator 42 is configured to cooperate with the rotor 41 and rotate and drive the rotor 41.

The first rotating shaft 40 is arranged to pass through the second housing member 52 and is extended to the third housing member 53. The first rotating shaft 40 is supported in a rotatable manner by a first bearing 71 provided n the first housing member 51, a second bearing 72 provided in the second housing member 52 and a third bearing 73 provided in the third housing member 53. According to the embodiment, each of the bearings is configured by a ball bearing having a plurality of balls. According to a modification, each of the bearings may be configured by another type of bearing, for example, a needle bearing.

A speed-up gear having a first gear 43 and a second gear 44 is placed in the speed-up chamber 57. The first gear 43 is mounted to the first rotating shaft 40 that is driven by the compressor motor 350 described above. The second gear 44 is mounted to a second rotating shaft 45. The second rotating shaft 45 has one end that is supported in a rotatable manner by a fourth bearing 74 provided in the second housing member 52. The second rotating shaft 45 is arranged to pass through the third housing member 53 and has the other end that is extended into the compression chamber 58. Engagement of the first gear 43 with the second gear 44 causes the rotational force of the first rotating shaft 40 to be transmitted to the second rotating shaft 45. As a result, this causes the second rotating shaft 45 to rotate at a higher speed than the first rotating shaft 40. The speed-up gear described above also serves as a driving mechanism to drive the impeller 46. The speed-up chamber 57 of the embodiment may thus also referred to as drive chamber.

The impeller 46 is mounted to the second rotating shaft 45 and is placed in the compression chamber 58. The impeller 46 is rotated at a high speed to compress the air that passes through the oxidizing gas supply pipe 330. According to the embodiment, the impeller 46 is employed as the rotating body. Any rotating body configured to pressure feed the air may be replaced with the impeller 46. A mechanical seal 47 is provided at a location of the third housing member 53 where the second rotating shaft 45 passes through. The mechanical seal 47 serves to suppress oil flowing through in the speed-up chamber 57 as described later from penetrating into the compression chamber 58-side.

According to the embodiment, an oil discharge opening 67 is provided above the speed-up chamber 57 to discharge the oil. The oil discharged from the oil discharge opening 67 flows down along the first gear 43 and the second gear 44 and contributes to lubricate and cool down the speed-up gear. The oil flowing in the speed-up chamber 57 passes through the first oil flow path 60 that is open to a bottom portion of the speed-up chamber 57 and is cooled down by the oil cooler 68. The oil cooled down by the oil cooler 68 is led to the oil reservoir 62 provided in the fourth housing member 54 and is temporarily accumulated in the oil reservoir 62. The second oil flow path 66 provided with the oil pump 64 has one end that is placed in the oil reservoir 62. The oil pump 64 serves to pump up the oil accumulated in the oil reservoir 62. The oil pump 64 is configured to generate a driving force for circulating the oil between the speed-up chamber 57 and the oil cooler 68. The oil discharge opening 67 described above is formed at the other end of the second oil flow path 66. The oil pumped up from the oil reservoir 62 is discharged from the oil discharge opening 67 and is again flowed into the speed-up chamber 57.

The depressurization pipe 30 has a first end portion that is connected with a portion of the oil reservoir 62 above a location where the oil is accumulated therein. The depressurization pipe 30 also has a second end portion that is open to the atmosphere as described later. The portion of the oil reservoir 62 above the location where the oil is accumulated therein is arranged to communicate with the speed-up chamber 57. In the case of an increase in internal pressure of the speed-up chamber 57, this configuration causes the gas to be discharged from the depressurization pipe 30 to outside of the compressor 320 and thereby suppresses a further increase in internal pressure of the speed-up chamber 57.

(A-3) Arrangement of Compressor and Depressurization Pipe

Figure 3:
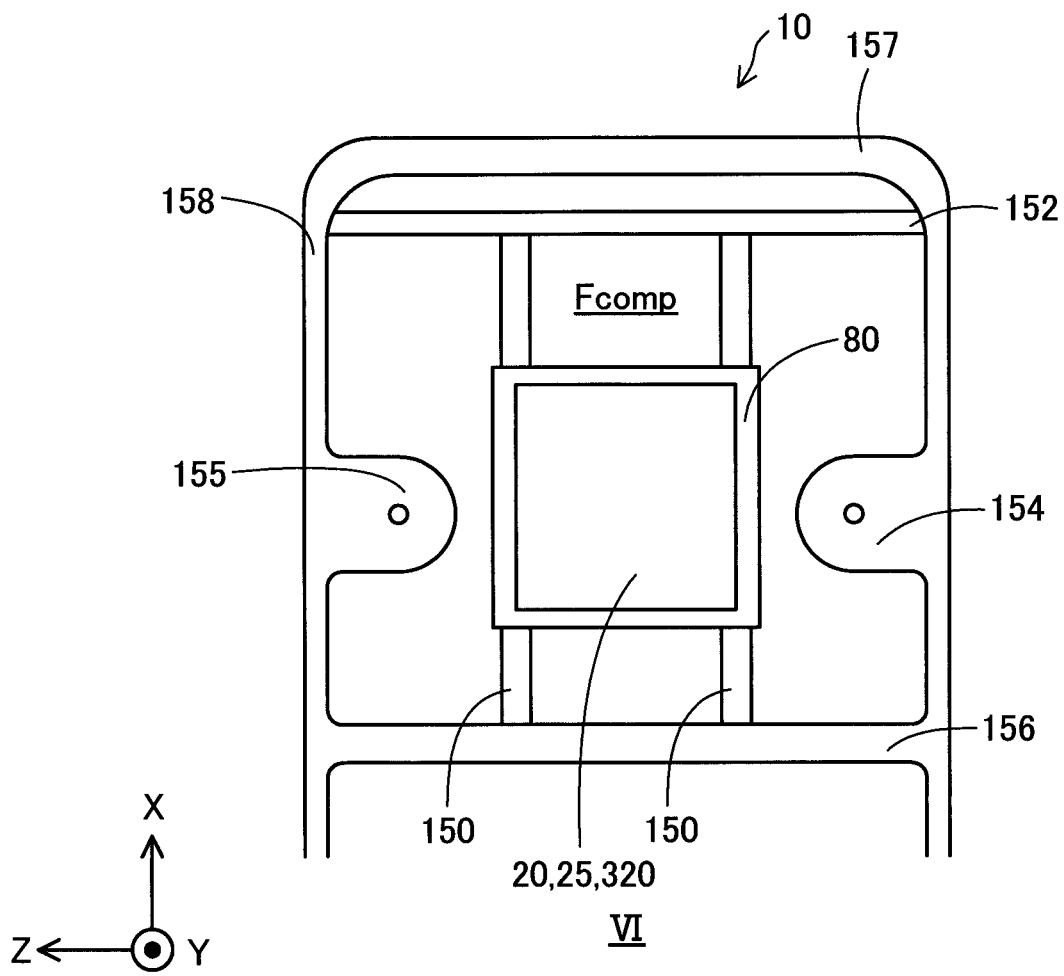
FIG. 3 is a plan view schematically illustrating an arrangement inside of a front compartment.

FIG. 3 is a plan view schematically illustrating an arrangement inside of a front compartment (Fcomp) of the fuel cell vehicle 10 according to the embodiment. In the fuel cell vehicle 10 of the embodiment, the compressor 320 is stacked with the fuel cell 20 and a high voltage unit 25 described later to be placed in the front compartment. A stacked structure including the compressor 320, the fuel cell 20 and the high voltage unit 25 described later is fixed to the vehicle body via a stack frame 80 and side members 150 described later. In the fuel cell vehicle 10 of the embodiment, a major part of the fuel gas supply system 200 except the fuel gas tank 210, the oxidizing gas supply system 300 and the cooling system 500 are placed in the front compartment. The remaining configuration other than the stacked structure of the fuel cell 20, the high voltage unit 25 and the compressor 320 is omitted from the illustration of FIG. 3.

XYZ axes that are orthogonal to one another are shown in FIG. 3. Similar XYZ axes are shown in FIGS. 4 to 8 described later, with a view to indicating the correspondence relationship of the directions in the respective drawings. An X-axis direction indicates a horizontal direction. A +X-axis direction indicates a moving direction of the fuel cell vehicle. A Y-axis direction indicates a vertical direction. A +Y-axis direction is also called "vertically upward direction", and a −Y-axis direction is also called "vertically downward direction". A Z-axis direction indicates a width direction of the fuel cell vehicle. A +Z-axis direction indicates a leftward direction of the fuel cell vehicle, and a −Z-axis direction indicates a rightward direction of the fuel cell vehicle.

A front bumper 157 is provided in front of the front compartment, as part of a body 158. A rear side of the front compartment is parted from a vehicle interior VI by a dash panel 156. In the fuel cell vehicle 10, a cross member 152 extended in the width direction of the vehicle (Z-axis direction) and two side members 150 extended in a front-rear direction of the vehicle (X-axis direction) are provided to be connected with the body 158. The two side members 150 and the cross member 152 serve to enhance the strength of the vehicle body. As shown in FIG. 3, parts of the two side members 150 and the cross member 152 are arranged to pass through the front compartment. A pair of suspension towers 154 and 155 are provided in the front compartment to be protruded upward. The pair of suspension towers 154 and 155 are formed to cover a front suspension that is placed below the vehicle body to support front wheels of the fuel cell vehicle 10 and serve to support an upper end portion of the front suspension.

Figure 4:
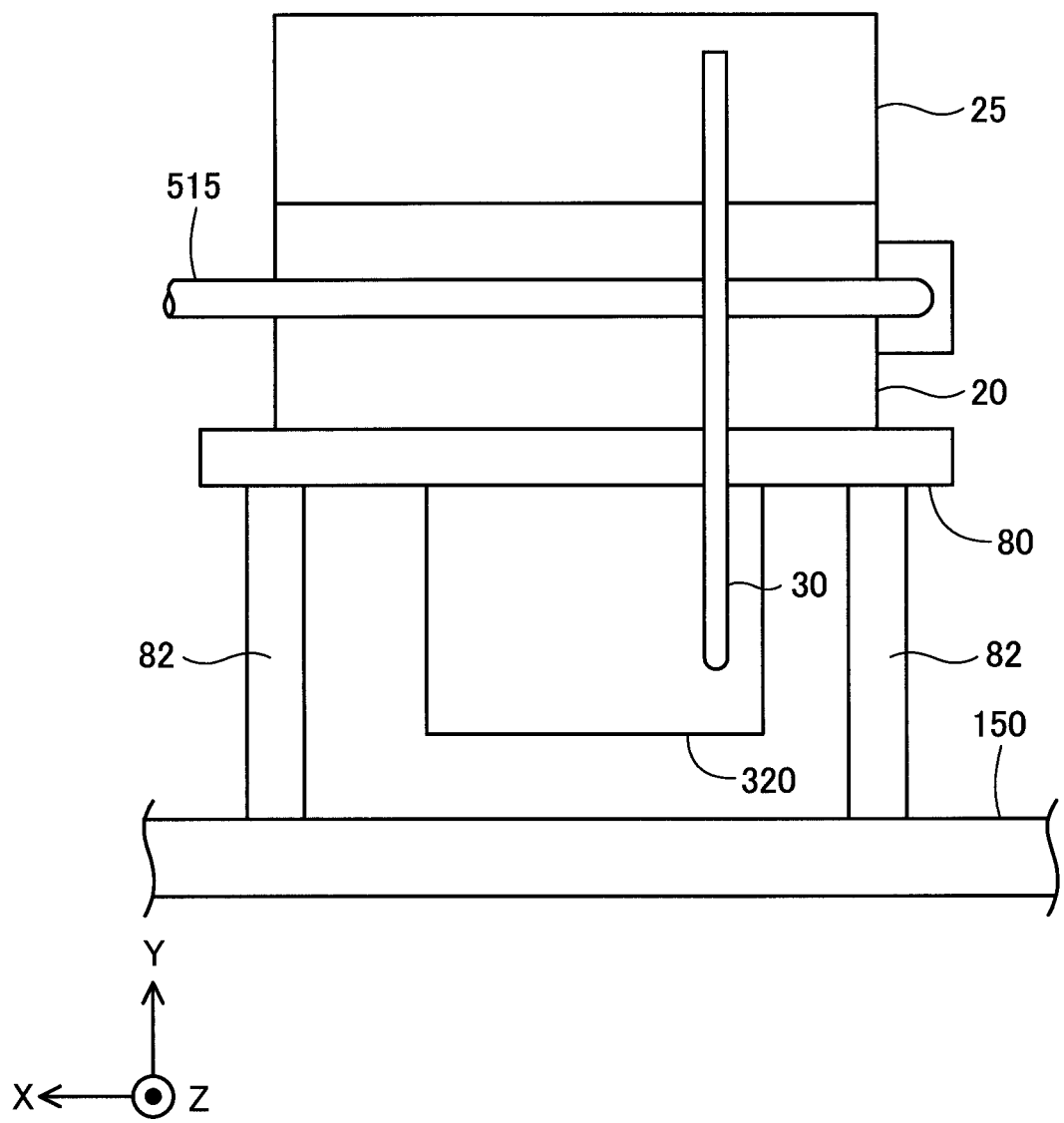
FIG. 4 is a diagram schematically illustrating an arrangement of a compressor with a fuel cell.

FIG. 4 is a diagram schematically illustrating an arrangement of the compressor 320 with the fuel cell 20. FIG. 4 illustrates devices including the compressor 320 and the fuel cell 20 when being viewed from a left side face of the fuel cell vehicle 10.

As shown in FIG. 4, the fuel cell 20 is mounted on the stack frame 80. The fuel cell 20 includes a stack formed by stacking unit cells and a stack casing provided to place the stack therein. The stack casing is fixed to the stack frame 80. The stack frame 80 is made of a material having high strength, for example, a metal material or a fiber reinforced plastic (FRP) material such as carbon fiber reinforced plastic (CFRP) material and is fixed to the two side members 150 via mount portions 82. At least part of the devices placed in the front compartment, for example, the fuel cell 20, is mounted to the stack frame 80, so as to be fixed in the front compartment.

The compressor 320 is placed below the stack frame 80 and is mounted to the stack frame 80 via brackets (not shown). Additionally, the hydrogen pump 290 and the gas liquid separator 280 are mounted below the stack frame 80 (not shown). The arrangement of the compressor 320 and the hydrogen pump 290 near to the fuel cell 20 shortens the pipings from the compressor 320 and from the hydrogen pump 290 to the fuel cell 20 and thereby reduces a pressure loss in these pipings.

Additionally, the high voltage unit 25 is placed above the fuel cell 20. In the high voltage unit 25, a high voltage device that is involved in power generation of the fuel cell 20 and that is operated at a relatively high voltage is placed in a casing. The high voltage device placed in the high voltage unit 25 of the embodiment includes a DC-DC converter configured to step up an output voltage of the fuel cell 20.

A cooling medium piping included in the cooling system 500 is placed on a left side face that is one side face of the fuel cell 20. According to the embodiment, the cooling medium piping placed on one side face of the fuel cell 20 is the cooling medium discharge pipe 515. Another part of the cooling medium piping may be placed on one side face of the fuel cell 20, in place of the cooling medium discharge pipe 515. The cooling medium discharge pipe 515 has one end that is connected with the fuel cell 20 and the other end that is extended toward the radiator 530 placed in front of the front compartment. According to the embodiment, the cooling medium discharge pipe 515 is provided to be extended in the horizontal direction.

Furthermore, the depressurization pipe 30 is placed on the one side face of the fuel cell 20 described above. As described above, the first end portion of the depressurization pipe 30 is connected with the portion of the oil reservoir 62 of the compressor 320 above the location where the oil is accumulated therein. The second end portion of the depressurization pipe 30 is open to the atmosphere at a position overlapping with the high voltage unit 25 when being viewed from the left side face of the fuel cell vehicle 10. In the depressurization pipe 30, a portion extended vertically upward from the first end portion toward the second end portion is called "rising portion". According to the embodiment, the depressurization pipe 30 is provided to be entirely extended vertically upward to form the "rising portion". According to the embodiment, the depressurization pipe 30 is placed to be farther away from the fuel cell 20 than the cooling medium discharge pipe 515. The depressurization pipe 30 is to be fixed at least at one position on a side face shown in FIG. 4 relative to at least one of, for example, the fuel cell 20, the stack frame 80 and the high voltage unit 25.

According to the embodiment, the depressurization pipe 30 is placed in a distance close to the cooling medium discharge pipe 515 such as to be cooled down by the cooling medium discharge pipe 515. It may be experimentally determined whether the depressurization pipe 30 is placed in the distance close to the cooling medium discharge pipe 515 such as to be cooled down by the cooling medium discharge pipe 515, for example, by mounting a temperature sensor to the depressurization pipe 30 and comparing the measured temperature of the depressurization pipe 30 in the case where the cooling medium flows through the cooling medium discharge pipe 515 with the measured temperature of the depressurization pipe 30 in the case where no cooling medium flows through the cooling medium discharge pipe 515. The depressurization pipe 30 and the cooling medium discharge pipe 515 may be in contact with each other or may not be in contact with each other. The distance that allows the depressurization pipe 30 to be cooled down by the cooling medium discharge pipe 515 is, for example, preferably not greater than 3 cm, is more preferably not greater than 1 cm, and is furthermore preferably not greater than 5 mm. In terms of suppressing a potential trouble, for example, the occurrence of resonance, caused by the arrangement of the depressurization pipe 30 close to the cooling medium discharge pipe 515, the distance between the depressurization pipe 30 and the cooling medium discharge pipe 515 is preferably, for example, not less than 3 mm.

As shown in FIG. 3, the depressurization pipe 30 and the cooling medium discharge pipe 515 are placed to intersect with each other on the one side face when being viewed from a direction opposed to the one side face of the fuel cell 20 (from the left side face). The configuration of the depressurization pipe 30 and the cooling medium discharge pipe 515 that are placed "to intersect with each other on the one side face when being viewed from the direction opposed to the one side face of the fuel cell 20" includes a configuration that part of the depressurization pipe 30 and part of the cooling medium discharge pipe 515 are arranged parallel to each other to overlap with each other when being viewed in the direction opposed to the one side face.

The depressurization pipe 30 is extended vertically upward in the illustrated example of FIG. 4. The depressurization pipe 30 may have another configuration as log as it is extended vertically upward. The arrangement of the depressurization pipe 30 that is "extended vertically upward" means that the extending direction of the depressurization pipe 30 from the first end portion connected with an outer wall of the compressor 320 toward the second end portion is a direction going up relative to the horizontal direction. The extending direction of the cooling medium piping (cooling medium discharge pipe 515) on the one side face of the fuel cell 20 may be a direction other than the horizontal direction. Any arrangement may be employed as long as the depressurization pipe 30 and the cooling medium discharge pipe 515 are placed to intersect with each other on the one side face when being viewed in the direction opposed to the one side face of the fuel cell 20.

The fuel cell vehicle 10 of the embodiment having the configuration described above is provided with the depressurization pipe 30 to suppress an increase in the internal pressure of the compressor 320 and thereby suppress oil leakage into the compression chamber 58. The depressurization pipe 30 is cooled down by the cooling medium piping, so that the vaporized oil included in the gas discharged from the depressurization pipe 30 is condensed in the depressurization pipe 30. Furthermore, the presence of the rising portion in the depressurization pipe 30 further accelerates condensation of the oil in the depressurization pipe 30 and encourages the condensed oil to be returned to the first end portion side. This configuration accordingly suppresses reduction of the oil flowing in the drive chamber.

During operation of the compressor 320, heat generation inside of the motor chamber 56 and in the speed-up chamber 57 increases the internal pressure of the compressor 320. In the compressor 320, the oil reservoir 62 is arranged to communicate with the speed-up chamber 57. When the internal pressure of the speed-up chamber 57 increases, the gas is discharged from the depressurization pipe 30 to the outside of the compressor 320. This accordingly suppresses a further increase in the internal pressure of the speed-up chamber 57. Suppressing a further increase in the internal pressure of the speed-up chamber 57 results in suppressing oil leakage from the speed-up chamber 57 into the compression chamber 58. The oil leakage into the compression chamber 58 is likely to cause the oil to be mixed with the air supplied from the compressor 320 to the fuel cell 20 and is likely to cause deterioration of, for example, a catalyst and seal members provided in the fuel cell 20. Providing the depressurization pipe 30 reduces the possibility of the occurrence of such troubles.

Furthermore, according to the embodiment, the depressurization pipe 30 is arranged to intersect with the cooling medium discharge pipe 515 on the one side face of the fuel cell 20 when being viewed in the direction opposed to the one side face of the fuel cell 20. This configuration causes the depressurization pipe 30 to be cooled down by the cooling medium piping and thereby causes the vaporized oil included in the gas flowing through the depressurization pipe 30 to be condensed. Moreover, the depressurization pipe 30 has the rising portion that is extended vertically upward. This configuration causes the oil condensed and liquefied in the depressurization pipe 30 to be moved down in the depressurization pipe 30, to be returned to the oil reservoir 62 and to be supplied again to the speed-up chamber 57. Collecting the vaporized oil in this manner reduces discharge of oil accompanied with the operation of suppressing an increase in the internal pressure of the compressor 320 and thereby suppresses oil shortage in the compressor 320.

According to the embodiment, the compressor 320 is placed along with the fuel cell 20 in the front compartment that is in such an environment as to relatively suppress the flow of the outside air and the heat release and to easily raise the temperature. This configuration especially significantly provides the advantageous effect of suppressing an increase in the internal pressure of the compressor 320. Furthermore, as shown in FIG. 4, the fuel cell 20 and the compressor 320 are arranged in the front compartment to overlap with each other in the vertical direction enables the internal space of the front compartment to be used efficiently. Additionally, the placement of the compressor 320 below the fuel cell 20 readily achieves the configuration that the depressurization pipe 30 extended vertically upward is cooled down by the cooling medium piping.

According to the embodiment, the depressurization pipe 30 is provided to be extended vertically upward and is laid out above the compressor 320 to be open to the atmosphere. Even in the event of penetration of liquid water into the front compartment due to, for example, splash of water in the rain, this configuration suppresses liquid water from entering the compressor 320 through the depressurization pipe 30.

B. Second Embodiment

Figure 5:
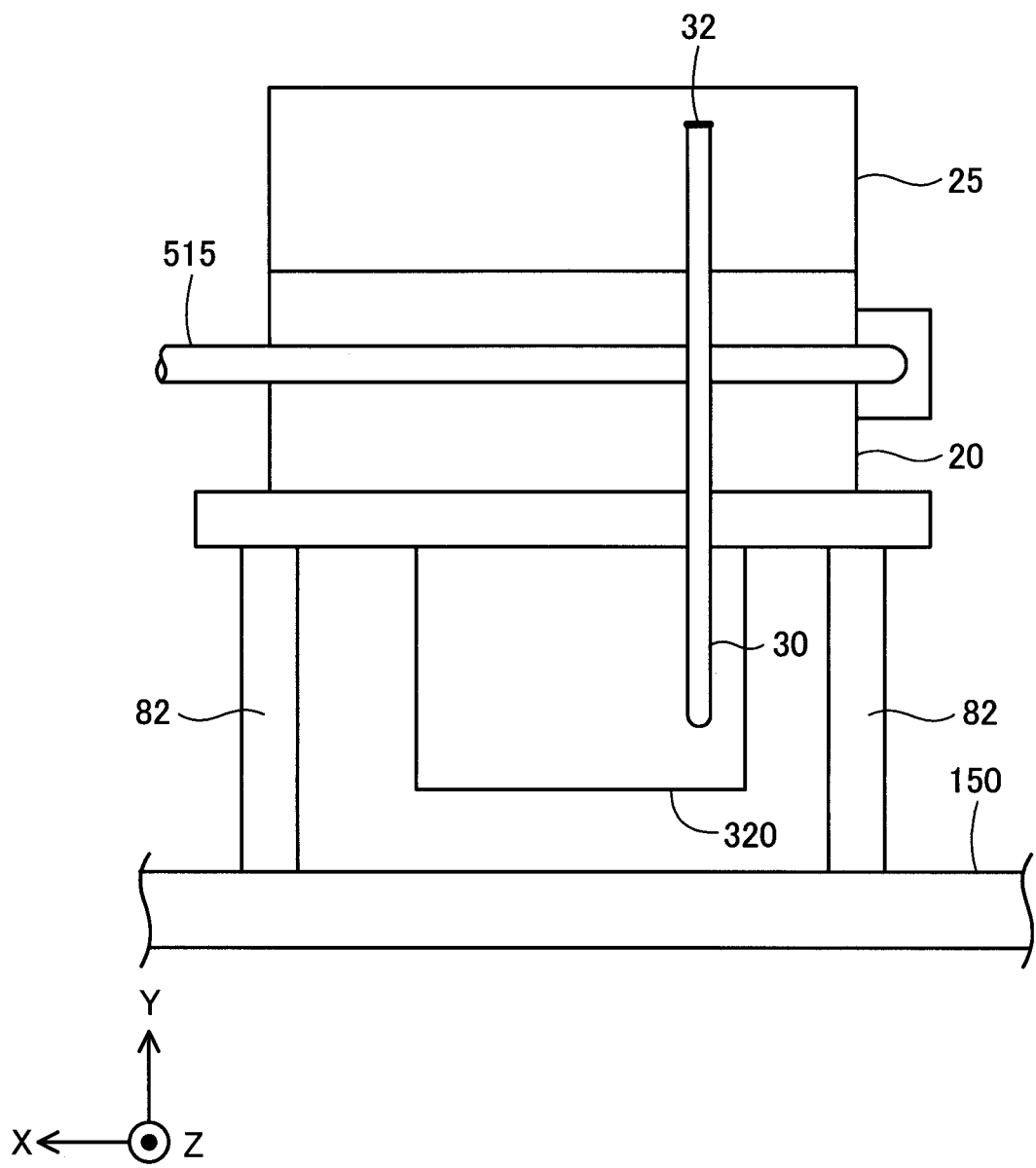
FIG. 5 is a diagram schematically illustrating another arrangement of the compressor with the fuel cell.

FIG. 5 is a diagram schematically illustrating an arrangement of a compressor 320 along with the fuel cell 20 in a fuel cell vehicle 10 according to a second embodiment, like the diagram of FIG. 4. Like components in the fuel cell vehicle 10 of the second embodiment to those in the fuel cell vehicle 10 of the first embodiment are expressed by like reference signs.

The compressor 320 of the second embodiment is provided with a waterproof ventilation film 32 that is placed in a second end portion of a depressurization pipe 30 to cover the flow path of the depressurization pipe 30, unlike the configuration of the compressor 320 of the first embodiment. The waterproof ventilation film 32 is a membrane that allows for passage of a gas between inside and outside of the depressurization pipe 30, while preventing passage of liquid water. The waterproof ventilation film 32 is made of a water-repellent resin, for example, polytetrafluoroethylene (PTFE) and may be a film with a large number of small pores formed to pass through in a film thickness direction. Accordingly, the waterproof ventilation film 32 has water repellency to suppress penetration of water from outside of the compressor 320 and has a porous structure to allow for discharge of the gas from inside of the compressor 320. One example of a commercially available film employable for the waterproof ventilation film 32 is TEMISH (registered trademark) S-NTF810A (manufactured by NITTO DENKO CORPORATION)

This configuration of the second embodiment has similar advantageous effects to those of the first embodiment described above. The waterproof ventilation film 32 provided in the second end portion of the depressurization pipe 30 enhances the effect of suppressing penetration of liquid water into the compressor 320. The waterproof ventilation film 32 is not necessarily provided at an edge on the second end portion side of the depressurization pipe 30, but it is desirable to place the waterproof ventilation film 32 at a position closer to the edge. This configuration suppresses accumulation of liquid water at the edge on the second end portion of the depressurization pipe 30.

C. Third Embodiment

Figure 6:
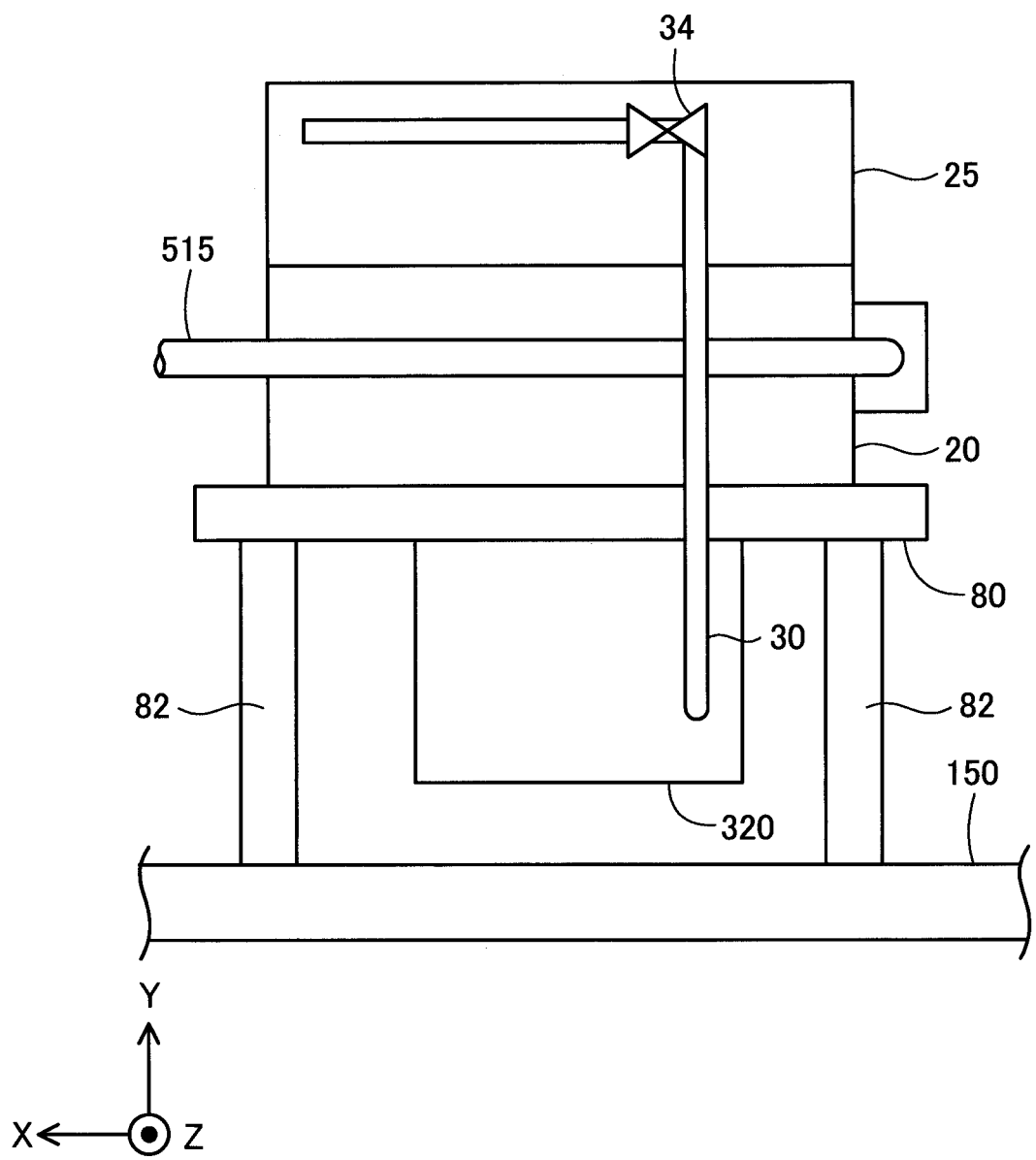
FIG. 6 is a diagram schematically illustrating another arrangement of the compressor with the fuel cell.

FIG. 6 is a diagram schematically illustrating an arrangement of a compressor 320 along with the fuel cell 20 in a fuel cell vehicle 10 according to a third embodiment, like the diagram of FIG. 4. Like components in the fuel cell vehicle 10 of the third embodiment to those in the fuel cell vehicle 10 of the first embodiment are expressed by like reference signs.

The compressor 320 of the third embodiment is provided with an electromagnetic valve 34 that is placed in the middle of a depressurization pipe 30. The electromagnetic valve 34 is controlled to be opened and closed by the controller 900. At an open position of the electromagnetic valve 34, the opening of a second end portion of the depressurization pipe 30 is connected with the oil reservoir 62. At a closed position of the electromagnetic valve 34, on the other hand, the opening of the second end portion of the electromagnetic valve 34 is disconnected from the oil reservoir 62. Accordingly, the electromagnetic valve 34 serves to change over the flow path of the depressurization pipe 30 between the open position and the closed position. The electromagnetic valve 34 may be controlled to be closed, for example, when it is relatively unlikely to cause oil leakage into the compression chamber 58 due to a temperature rise and an increase in the internal pressure of the compressor 320. More specifically, for example, the electromagnetic valve 34 may be controlled to be opened during operation of the compressor 320 and to be closed during stop of the compressor 320. In another example, the electromagnetic valve 34 may be opened during operation of the compressor 320 in the case where the rotation speed of the compressor motor 350 is a high rotation speed that exceeds a predetermined reference value and to be otherwise closed.

This configuration of the third embodiment provides the effect of suppressing reduction of oil due to vaporization of the oil, in addition to the similar advantageous effects of the first embodiment described above. More specifically, when there is a relatively small risk of oil leakage into the compression chamber 58 due to an increase in the internal pressure of the compressor 320, appropriately closing the electromagnetic valve 34 suppresses the vaporized oil from being discharged via the depressurization pipe 30.

As shown in FIG. 6, according to the third embodiment, the depressurization pipe 30 is not entirely extended vertically upward but has a bent portion in the middle. A second end portion side of the bent portion of the depressurization pipe 30 is formed to be extended in the horizontal direction. As long as the depressurization pipe 30 at least partly has the rising portion that is extended vertically upward, this rising portion provides the effect of making a downward flow of the cooled and condensed oil and collecting the oil. This rising portion provided in at least part of the depressurization pipe 30 including a first end portion connected with the of reservoir 62 enhances the effect of returning the collected oil to the oil reservoir 62. When being viewed in a direction opposed to the one side face of the fuel cell 20 described above (from the left side face), this rising portion is arranged to intersect with the cooling medium discharge pipe 515 on the one side face. This configuration enhances the effect of condensing and collecting the oil. As shown in FIG. 6, the depressurization pipe 30 may include a portion that is located on the second end portion side of the rising portion to be extended in the horizontal direction toward the second end portion or to be extended downward relative to the horizontal direction. Even when liquid water is penetrated from the opening of the second end portion, the configuration of the depressurization pipe 30 that includes the portion located on the second end portion side of the rising portion to be extended in the horizontal direction or to be extended downward suppresses the penetrated liquid water from entering the compressor 320.

In the configuration of the third embodiment related to the compressor 320 and the fuel cell 20 shown in FIG. 6, like the second embodiment, a waterproof ventilation film 32 may be provided in the second end portion of the depressurization pipe 30. When the compressor 320 is driven in a subzero environment or when operation of the compressor 320 is started in a subzero environment, the configuration of this modification suppresses liquid water penetrating from the opening of the second end portion of the depressurization pipe 30 from being frozen to fasten the electromagnetic valve 34 and cause malfunction of the electromagnetic valve 34.

D. Fourth Embodiment

Figure 7:
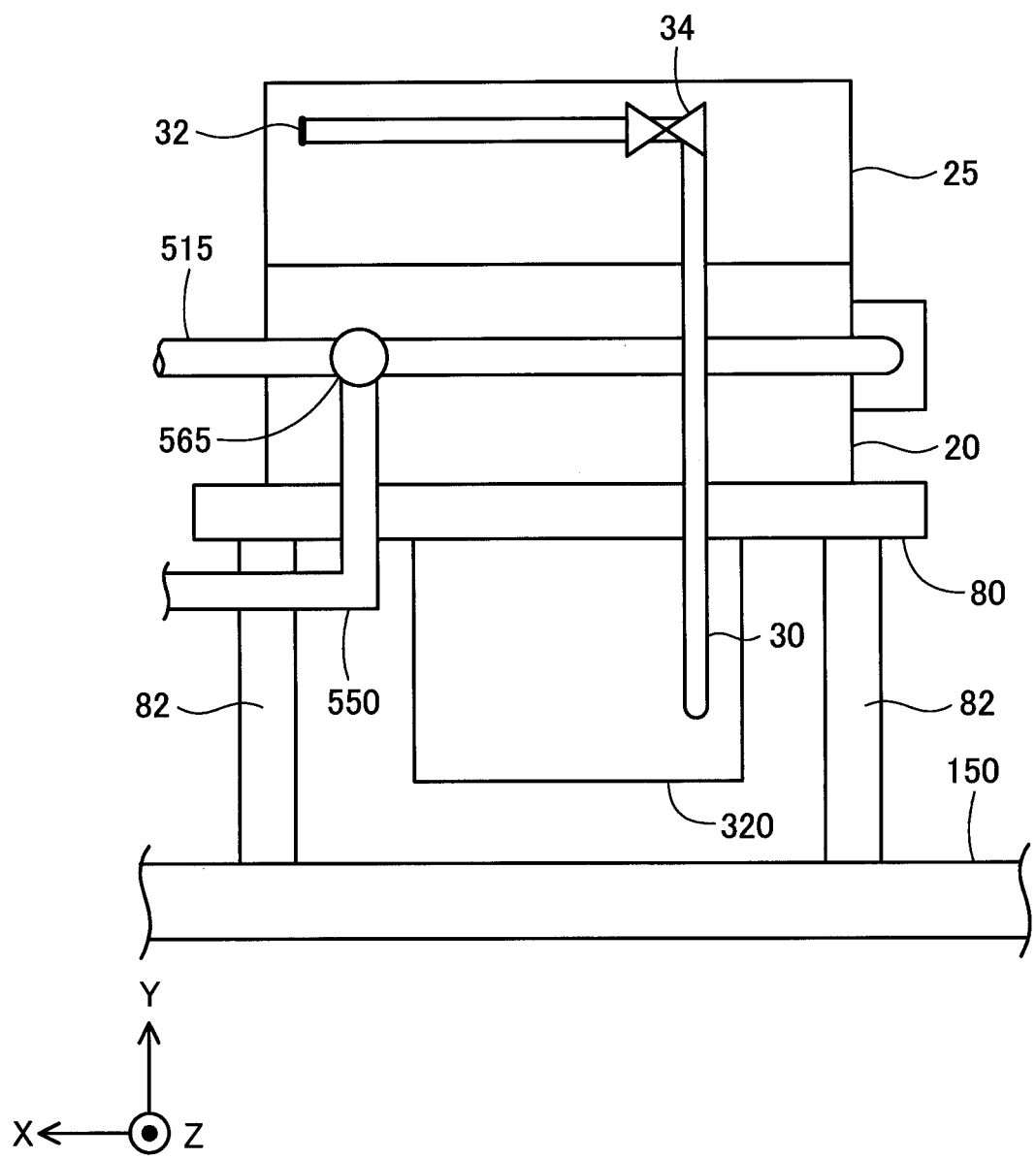
FIG. 7 is a diagram schematically illustrating another arrangement of the compressor with the fuel cell.

FIG. 7 is a diagram schematically illustrating an arrangement of a compressor 320 along with the fuel cell 20 in a fuel cell vehicle 10 according to a fourth embodiment, like the diagram of FIG. 4. Like components in the fuel cell vehicle 10 of the fourth embodiment to those in the fuel cell vehicle 10 of the first embodiment are expressed by like reference signs.

According to the fourth embodiment, the cooling medium piping (cooling medium discharge pipe 515) is provided with a rotary valve 565 on one side face of the fuel cell 20. The rotary valve 565 is provided at the connection between the cooling medium discharge pipe 515 and the cooling medium bypass pipe 550 to change the ratio of the flow rate of the cooling medium flowing through the radiator 530 and the flow rate of the cooling medium bypassing the radiator 530 as described above. The rotary valve 565 includes a rotating body configured to regulate the flow rate of the fluid and accordingly has a larger size than that of a conventional on-off valve and a higher rigidity than that of the cooling medium piping. As one example, FIG. 7 illustrates a configuration of the depressurization pipe 30 provided with the waterproof ventilation film 32 of the second embodiment and with the electromagnetic valve 34 of the third embodiment. The depressurization pipe 30 may, however, be configured without the waterproof ventilation film 32 and the electromagnetic valve 34.

Figure 8:
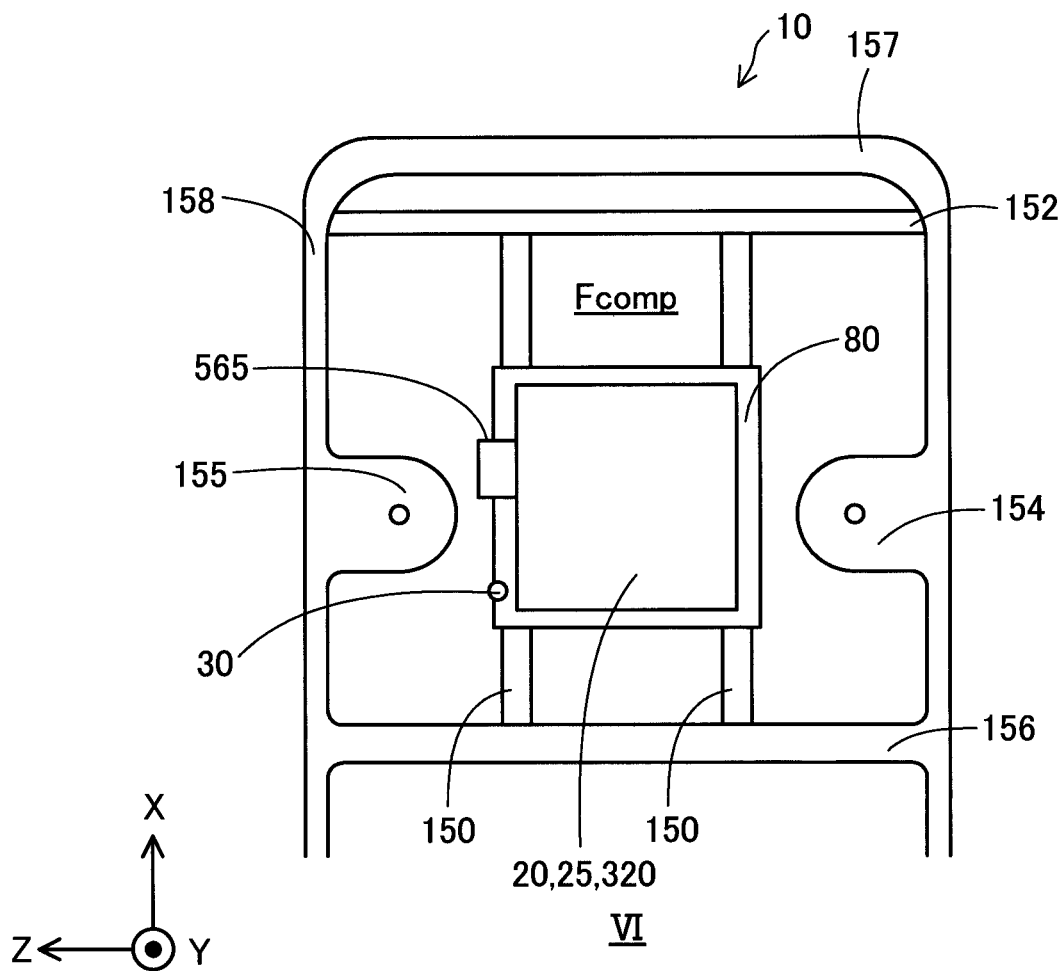
FIG. 8 is a plan view schematically illustrating another arrangement inside of the front compartment.

FIG. 8 is a plan view illustrating an arrangement inside of a front compartment (Fomp) in the fuel cell vehicle 10 of the fourth embodiment, like FIG. 3. As shown in FIG. 8, a stacked structure of the fuel cell 20, the high voltage unit 25 and the compressor 320 is placed between a pair of suspension towers 154 and 155 in the front compartment. The rotary valve 565 is opposed to one suspension tower 155 on one side face of the fuel cell 20 (left side face on the +Z-direction side), i.e., on a side face flush with the side face where the depressurization pipe 30 is placed. This rotary valve 565 is provided to be protruded from the depressurization pipe 30 in a direction farther away from the one side face.

According to the configuration of the fourth embodiment, the rotary valve 565 is placed on one side face of the fuel cell 20. Even when a shock load is applied to, for example, a side face of the fuel cell vehicle 10 to cause some member arranged in the front compartment to collide with the one side face of the fuel cell 20, the rotary valve 565 effectively prevents the shock from being applied to the depressurization pipe 30. For example, the suspension tower 155 first collides with the rotary valve 565, and the rotary valve 565 absorbs the shock, so as to reduce the impact applied to the depressurization pipe 30. This configuration accordingly reduces the possibility of oil leakage caused by damage of the depressurization pipe 30 when a shock is applied to the fuel cell vehicle 10. The oil used for the compressor 320 is generally combustible. Reducing the possibility of oil leakage thus enhances the safety of the fuel cell vehicle 10.

E. Other Embodiments (E1) According to each of the embodiments described above, the oil reservoir 62, the oil pump 64 and the coil cooler 68 are provided in the compressor 320. The present disclosure may, however, be implemented by a different configuration. For example, at least part of the oil reservoir 62, the oil pump 64 and the oil cooler 68 and an oil flow path connecting therewith may be provided outside of the compressor 320.

(E2) According to each of the embodiments described above, the first end portion of the depressurization pipe 30 is connected with the oil reservoir 62. The present disclosure may, however, be implemented by a different configuration. Any configuration may be employed to reduce the internal pressure of the compressor 320 and suppress oil leakage into the compression chamber 58 caused by a pressure increase. For example, the first end portion of the depressurization pipe 30 may be connected with the speed-up chamber 57. There is no rotating body or the like as a target of lubrication and cooling by oil in the location above the position where oil is accumulated in the oil reservoir 62. Accordingly, no oil flows in this space. Additionally, the oil reservoir 62 is arranged to communicate with the speed-up chamber 57 via the first oil flow path 60. This arrangement suppresses a pressure fluctuation in the speed-up chamber 57. Depressurization from this location is preferable, since this configuration achieves depressurization, while suppressing oil from being discharged from the depressurization pipe 30 due to a pressure fluctuation in the speed-up chamber 57.

According to another modification, the first end portion of the depressurization pipe 30 may be connected with an upstream side of the oil cooler 68 in the first oil flow path 60 or with a downstream side of the oil pump 64 in the second oil flow path 66. The configuration that the first end portion of the depressurization pipe 30 is connected with the oil flow path arranged to connect the oil cooler 68 with the oil pump 64 is preferable, since this configuration achieves depressurization, while suppressing oil from being discharged from the depressurization pipe 30 due to a pressure fluctuation in the speed-up chamber 57.

(E3) According to each of the embodiments described above, the fuel cell 20 and the compressor 320 are arranged to be integrated with each other via the stack frame 80. According to a modification, the fuel cell 20 and the compressor 320 may be arranged to be separated from each other. According to another modification, the fuel cell 20 and the compressor 320 may be placed in a different location from inside of the front compartment. The arrangement of the fuel cell 20 and the compressor 320 to be near to each other facilitates the layout of the depressurization pipe 30 and causes the depressurization pipe 30 to be cooled down by the cooling medium piping. This configuration has similar advantageous effects to those of each of the embodiments described above.

(E4) According to each of the embodiments described above, the compressor 320 is provided with the speed-up chamber 57. The present disclosure may, however, be implemented by a different configuration. According to a modification, the speed-up chamber 57 may be omitted from the configuration shown in FIG. 2, and the first rotating shaft 40 of the compressor motor 350 may also be used as the second rotating shaft 45 that is provided with the impeller 46. In this modification, oil is flowed in the motor chamber 56, and the motor chamber 56 serves as the "drive chamber that is arranged to separate from the compression chamber 58, that is provided with a driving mechanism placed therein to drive the impeller 46 as a rotating body, that is configured such that oil flows through therein, and that is placed to communicate with the first end portion of the depressurization pipe 30". In this modification, the first end portion of the depressurization pipe 30 may be connected with the motor chamber 56, in place of the oil reservoir 62. In the configuration that the compressor 320 is provided with the speed-up chamber 57 like each of the above embodiments, oil may be flowed in both the speed-up chamber and the motor chamber 56.

(E5) According to each of the embodiments described above, the fuel cell system 15 including the compressor 320 is mounted on the fuel cell vehicle 10. The present disclosure may, however, be implemented by a different configuration. In such modifications, placing the compressor 320 in an environment that suppresses heat release, for example, placing the fuel cell 20 and the compressor 320 in a certain housing especially significantly provides advantageous effects similar to those of each of the embodiments described above.

The present disclosure is not limited to any of the embodiments described above but may be implemented by various other configurations without departing from the scope of the disclosure. For example, the technical features of any of the above embodiments may be replaced or combined appropriately, in order to solve part or all of the problems described above or in order to achieve part or all of the advantageous effects described above. Any of the technical features may be omitted appropriately unless the technical feature is described as essential herein. For example, the present disclosure may be implemented as the following aspects.

(1) According to one aspect of the present disclosure, there is provided a fuel cell system. This fuel cell system comprises a fuel cell; a compressor configured to compress the air and feed the compressed air to a cathode of the fuel cell; a cooling medium piping arranged such that a cooling medium flows through therein to cool down the fuel cell; and a depressurization pipe including a first end portion, a second end portion, and a rising portion that is extended vertically upward, the depressurization pipe being configured such that the first end portion is connected with the compressor and that the second end portion is open to the atmosphere. The compressor comprises a compression chamber configured to compress the air by a rotating body; and a drive chamber arranged to separate from the compression chamber, provided with a driving mechanism that is placed therein to drive the rotating body, configured such that oil flows through therein, and placed to communicate with the first end portion of the depressurization pipe. When being viewed in a direction opposed to one side face of the fuel cell, the depressurization pipe and the cooling medium piping are arranged to intersect with each other on the one side face.

The fuel cell system of this aspect is provided with the depressurization pipe to suppress a pressure increase in the compressor and thereby suppress oil leakage from the drive chamber into the compression chamber. The depressurization pipe is cooled down by the cooling medium piping. This configuration allows for condensation of the vaporized oil included in the gas discharged from the depressurization pipe. Furthermore, the presence of the rising portion provided in the depressurization pipe further promotes the condensation of the oil in the depressurization pipe and also encourages the condensed oil to be returned to the first end portion side. This configuration accordingly suppresses reduction of the oil flowing through inside of the drive chamber.

(2) In the fuel cell system of the above aspect, the cooling medium piping may comprise a rotary valve that is placed at a branch portion where the cooling medium piping is branched off and that is configured to change a flow rate of a branched flow of the cooling medium. The rotary valve may be arranged on the one side face of the fuel cell and is provided such as to be protruded from the depressurization pipe in a direction away from the one side face. Even when an impact load is applied to the one side face of the fuel cell, the fuel cell system of this aspect enables the rotary valve to prevent application of the impact onto the depressurization pipe and thereby reduces the possibility of oil leakage from the depressurization pipe.

(3) In the fuel cell system of the above aspect, the depressurization pipe may comprise a waterproof ventilation film that is placed in the second end portion and that is configured to allow for passage of a gas between inside and outside of the depressurization pipe, while preventing passage of liquid water. The fuel cell system of this aspect is provided with the waterproof ventilation film to suppress penetration of liquid water into the compressor.

(4) In the fuel cell system of the above aspect, the depressurization pipe may be provided with an electromagnetic valve configured to change over passage of the depressurization pipe between an open position and a closed position. When the electromagnetic valve is at the closed position, the fuel cell system of this aspect suppresses vaporization of the oil via the depressurization pipe and thereby suppresses reduction of the oil in the compressor.

(5) The fuel cell system of the above aspect may further comprise an oil reservoir provided to communicate with the drive chamber and configured to temporarily accumulate the oil flowing through the drive chamber. The first end portion of the depressurization pipe may be connected with a position above a location of the oil reservoir where the oil is accumulated. The fuel cell system of this aspect performs depressurization in the oil reservoir that is different from the drive chamber. This configuration achieves depressurization, while suppressing discharge of the oil from the depressurization pipe caused by a pressure fluctuation in the drive chamber.

(6) The fuel cell system of the above aspect may further comprise an oil cooler provided to communicate with the drive chamber and configured to cool down the oil that flows through the drive chamber; and an oil pump configured to generate a driving force for circulating the oil between the drive chamber and the oil cooler. The first end portion of the depressurization pipe may be connected with a flow path of the oil that is arranged to connect the oil cooler with the oil pump. The fuel cell system of this aspect performs depressurization between the oil cooler and the oil pump. This configuration achieves depressurization, while suppressing discharge of the oil from the depressurization pipe caused by a pressure fluctuation in the drive chamber.

The present disclosure may be implemented by various aspects other than those described above. For example, the present disclosure may be implemented by aspects of a vehicle equipped with a fuel cell system, a method of preventing oil leakage from a compressor.

What is claimed is:

1. A fuel cell system, comprising:
a fuel cell;
a compressor configured to compress air and feed compressed air to a cathode of the fuel cell;
a cooling medium piping arranged such that a cooling medium flows through therein to cool down the fuel cell; and
a depressurization pipe including a first end portion, a second end portion, and a rising portion that is extended vertically upward, the depressurization pipe being configured such that the first end portion is connected with the compressor and that the second end portion is open to the atmosphere, wherein
the compressor comprises:
a compression chamber configured to compress air by a rotating body; and
a drive chamber arranged separate from the compression chamber, provided with a driving mechanism that is placed therein to drive the rotating body, configured such that oil flows through therein, and placed to communicate with the first end portion of the depressurization pipe, wherein
when being viewed in a direction opposed to one side face of the fuel cell, the depressurization pipe and the cooling medium piping are arranged to intersect with each other on the one side face;
wherein the depressurization pipe and a cooling medium discharge pipe of the cooling medium pipe are placed with a distance of not less than 3 mm and not greater than 3 cm between the depressurization pipe and the cooling medium discharge pipe.

2. The fuel cell system according to claim 1,
wherein the cooling medium piping comprises a rotary valve that is placed at a branch portion where the cooling medium piping is branched off and that is configured to change a flow rate of a branched flow of the cooling medium, wherein
the rotary valve is arranged on the one side face of the fuel cell and is provided so as to be protruded from the depressurization pipe in a direction away from the one side face.

3. The fuel cell system according to claim 1,
wherein the depressurization pipe comprises a waterproof ventilation film that is placed in the second end portion and that is configured to allow for passage of a gas between inside and outside of the depressurization pipe, while preventing passage of liquid water.

4. The fuel cell system according to claim 1,
wherein the depressurization pipe is provided with an electromagnetic valve configured to change over passage of the depressurization pipe between an open position and a closed position.

5. The fuel cell system according to claim 1, further comprising:
an oil reservoir provided to communicate with the drive chamber and configured to temporarily accumulate the oil flowing through the drive chamber, wherein the first end portion of the depressurization pipe is connected with a position above a location of the oil reservoir where the oil is accumulated.

6. The fuel cell system according to claim 1, further comprising:
an oil cooler provided to communicate with the drive chamber and configured to cool down the oil that flows through the drive chamber; and
an oil pump configured to generate a driving force for circulating the oil between the drive chamber and the oil cooler, wherein
the first end portion of the depressurization pipe is connected with a flow path of the oil that is arranged to connect the oil cooler with the oil pump.

7. A fuel cell vehicle, comprising:
the fuel cell system according to claim 1, wherein
the fuel cell and the compressor are placed inside of a front compartment.

* * * * *